United States Patent
Dunleavy

(10) Patent No.: US 7,601,288 B2
(45) Date of Patent: Oct. 13, 2009

(54) METHOD OF FABRICATING A LUG ON A STRUCTURAL ELEMENT OF COMPOSITE MATERIAL, IN PARTICULAR A CONNECTING ROD

(75) Inventor: Patrick Dunleavy, Palaiseau (FR)

(73) Assignee: Messier-Dowty SA, Velizy Villacoublay (FR)

( * ) Notice: Subject to any disclaimer, the term of this patent is extended or adjusted under 35 U.S.C. 154(b) by 0 days.

(21) Appl. No.: 11/559,064

(22) Filed: Nov. 13, 2006

(65) Prior Publication Data

US 2009/0223588 A1   Sep. 10, 2009

(30) Foreign Application Priority Data

Nov. 23, 2005   (FR)   .................................. 05 11846

(51) Int. Cl.
  *B28B 21/70* (2006.01)
  *B32B 1/00* (2006.01)
  *F16D 1/00* (2006.01)
(52) U.S. Cl. ........................ 264/258; 264/156; 428/192
(58) Field of Classification Search ................. 428/192; 264/258, 155, 156
  See application file for complete search history.

(56) References Cited

U.S. PATENT DOCUMENTS

| 3,877,523 | A | * | 4/1975 | Ely | .............................. | 403/202 |
| 4,502,092 | A | * | 2/1985 | Bannink et al. | ............. | 361/218 |
| 4,571,355 | A | * | 2/1986 | Elrod | .......................... | 428/102 |
| 5,279,892 | A | | 1/1994 | Baldwin et al. | | |
| 5,899,241 | A | * | 5/1999 | David et al. | .................. | 139/409 |
| 6,036,904 | A | | 3/2000 | Fantino et al. | | |

FOREIGN PATENT DOCUMENTS

| DE | 3726340 A1 | 2/1989 |
| FR | 2060049 | 6/1971 |
| FR | 2705610 | 12/1994 |
| FR | 2759096 | 8/1998 |

* cited by examiner

*Primary Examiner*—Matthew J. Daniels
(74) *Attorney, Agent, or Firm*—McCormick, Paulding & Huber LLP

(57) ABSTRACT

The invention provides a method of fabricating a lug on a structural element of composite material made at least locally out of a stack of primary plies of composite fibers defining at least one extension for forming the lug. The method includes the step of separating the primary plies at least in the extension and of inserting intermediate plies between the primary plies.

9 Claims, 3 Drawing Sheets

METHOD OF FABRICATING A LUG ON A STRUCTURAL ELEMENT OF COMPOSITE MATERIAL, IN PARTICULAR A CONNECTING ROD

CROSS-REFERENCE TO RELATED APPLICATIONS

This application is entitled to the benefit of French Patent Application No. 0511846 filed on Nov. 23, 2005.

FIELD OF THE INVENTION

The invention relates to a method of fabricating a lug on a structural element of composite material, in particular a connecting rod.

BACKGROUND OF THE INVENTION

Connecting rods are known that comprise a hollow body of composite material, e.g. obtained by winding filaments around a mandrel, or indeed by winding a ply of woven fibers.

The thickness of the hollow body is obtained by winding an appropriate number of turns.

Composite material connecting rods are also known in which the solid body is made by stacking plies.

It is also known to provide extensions, either from the wall of the hollow body or from the solid body that serve to become the lugs of coupling forks. After the body has been polymerized, it suffices to pierce holes in the extensions and possibly to cut them to shape in order to obtain the lugs.

Nevertheless, the thickness of the lugs obtained in that way is the same as the thickness of the wall of the hollow body or the thickness of the solid body. Unfortunately that thickness is not necessarily sufficient. The state of the art is illustrated by the following patent documents: FR 2 060 049, DE 37 26 340, FR 2 705 610, U.S. Pat. No. 5,279,892, U.S. Pat. No. 6,036,904.

OBJECT OF THE INVENTION

An object of the invention is to propose a novel method of producing one or more lugs on a structural element of composite material.

BRIEF DESCRIPTION OF THE INVENTION

To achieve this object, the invention provides a method of fabricating a lug on a structural element of composite material made at least locally out of a stack of primary plies of composite fibers defining at least one extension for forming the lug, the method including the step of separating the primary plies at least in the extension and of inserting intermediate plies between the primary plies.

Thus, the thickness of the extension is no longer tied to the thickness of the structural element. In particular the extension can be made thicker in order to obtain a lug of suitable thickness.

BRIEF DESCRIPTION OF THE DRAWINGS

The invention can be better understood in the light of the following description given with reference to the figures in the accompanying drawings, in which:

FIG. 4 is a fragmentary view of the FIG. 1 pattern seen edge-on;

DETAILED DESCRIPTION OF THE INVENTION

Figure 1:
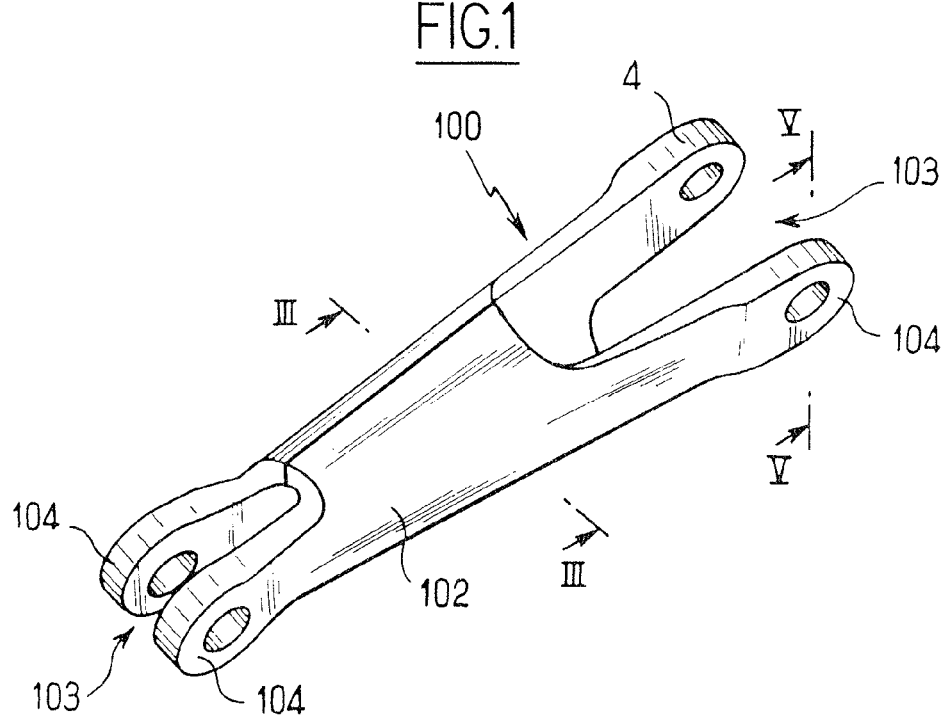
FIG. 1 is a perspective view of a connecting rod obtained by the method of the invention.

With reference to FIG. 1, the method of the invention serves to obtain a completely composite connecting rod 100 comprising a tubular body 102 with two forks 103, each comprising two facing lugs 104.

Figure 2:
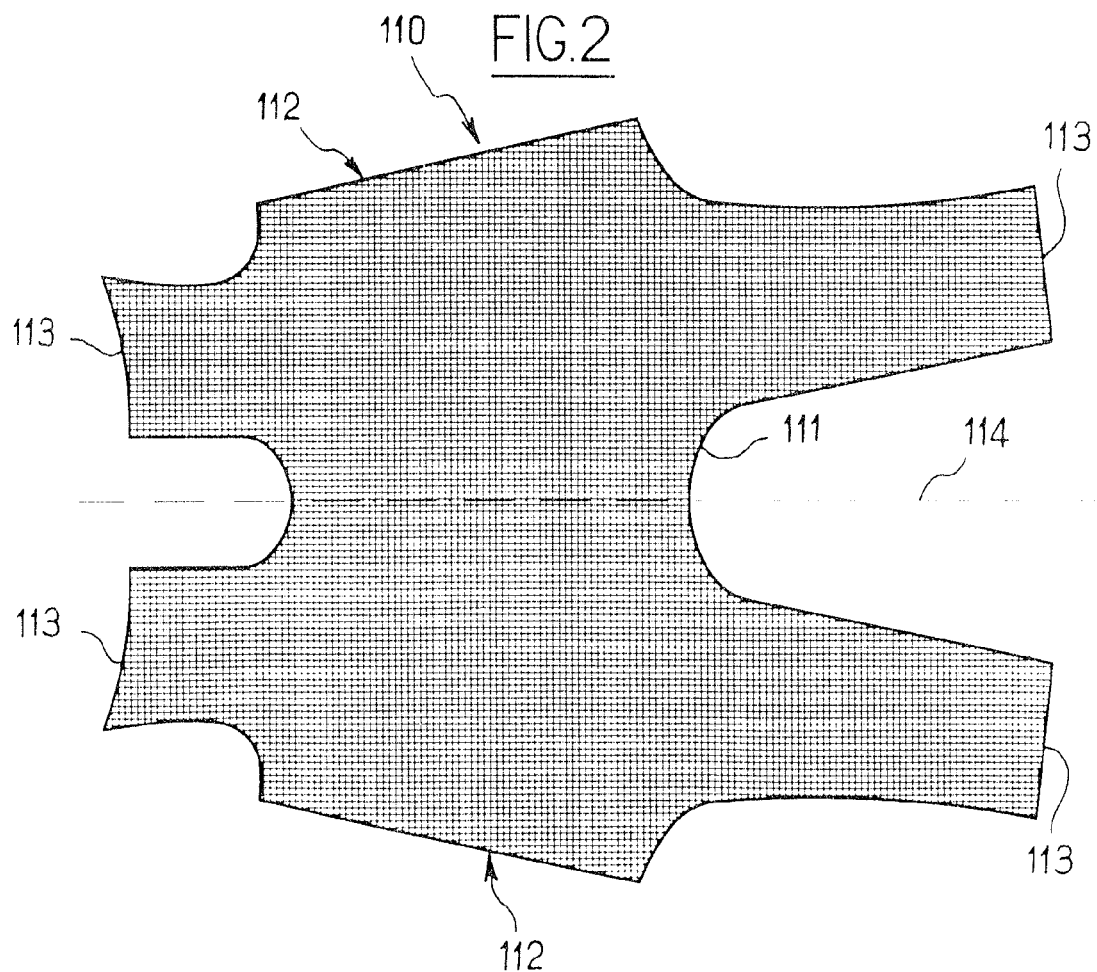
FIG. 2 is a face view of a cut-out pattern for fabricating a connecting rod of the invention.

According to a particular aspect of the invention shown in FIG. 2, an initial step lies in cutting out a pattern 110 from a fiber fabric, a carbon fiber fabric in this example, which pattern 110 has a central portion 111 with two opposite edges 112 and has four extensions 113 projecting therefrom, comprising two extensions at each end of the central portion 111, on either side of an axis of symmetry 114 of the pattern.

The fiber fabric is preferably obtained from a so-called "2.5 D" weave, comprising a plurality of primary plies having weft fibers interconnected by warp fibers that extend from one primary ply to another in order to bond the primary plies together. Such bonding between the primary plies enables them to be secured to one another, while allowing for relative sliding between the primary plies while the pattern is being shaped.

Figure 6:
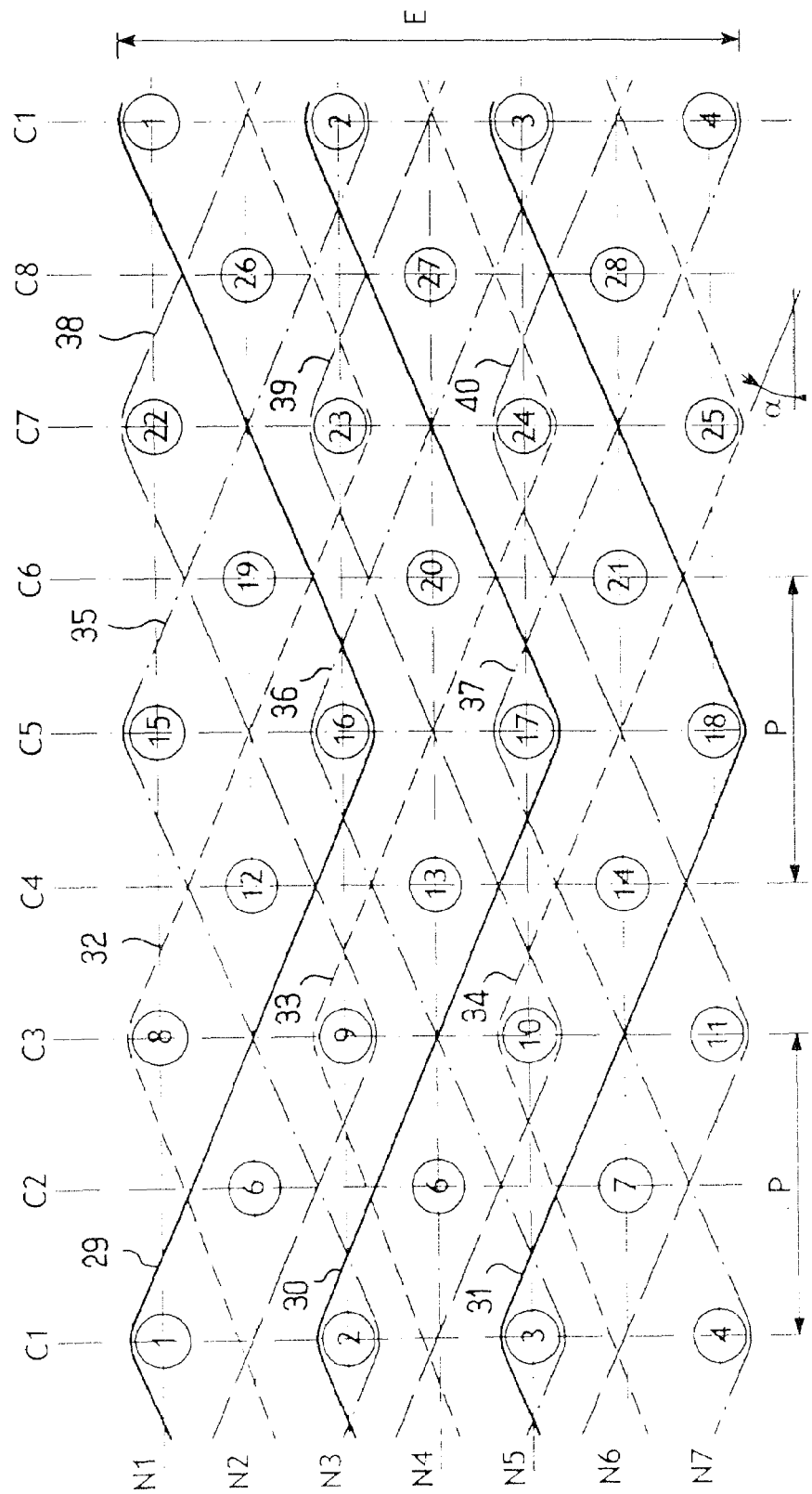
FIG. 6 is a diagrammatic view of a fabric comprising a plurality of bonded-together plies suitable for use in implementing the method of the invention.

In this respect, the preferred fabric is the fabric described in patent document FR 2 759 096, and described below with reference to FIG. 6. The fabric comprises a basic weave that is constituted:

firstly by at least twenty-eight weft fibers 1 to 28 organized in at least eight columns C1 to C8 each extending in the thickness direction E of the fabric, and disposed in a staggered configuration with alternation between columns C2, C4, C6, C8 having at least three superposed weft fibers spaced apart at a predetermined pitch P, and columns C1, C3, C5, C7 having at least four superposed weft fibers spaced apart by the same pitch P, the weft fibers 1 to 28 extending to define at least seven primary plies N1 to N7; and secondly, by at least twelve warp fibers 29 to 40 disposed in at least four parallel planes P1, P2, P3, P4 that are offset in the weft fiber direction, each plane containing three superposed parallel warp fibers arranged in each of these planes as follows:

a first warp fiber (respectively numbered 29, 32, 35, 38) connects the topmost warp fiber (1, 8, 15, 22) of a four-weft fiber column (C1, C3, C5, C7) to an upper intermediate weft fiber (16, 23, 2, 9) of a four-weft fiber column (C5, C7, C1, C3) that is spaced apart from the preceding column by at least two pitch steps P, the first warp fiber returning over a top end weft fiber (1, 8, 15, 22) of a four-weft fiber column (C1, C3, C5, C7) that is spaced apart from the first column by at least four pitch steps P;

a second warp fiber (respectively numbered 30, 33, 36, 39) connecting a top intermediate weft fiber (2, 9, 16, 23) of a four-weft fiber column (C1, C3, C5, C7) to a lower intermediate weft fiber (17, 24, 3, 10) of a four-weft fiber column (C5, C7, C1, C3) that is spaced apart from the preceding column by at least two pitch steps P, the second warp fiber returning over an upper intermediate weft fiber (2, 9, 16, 23) of a four-weft fiber column (C1, C3, C5, C7) that is spaced apart from the first column by at least four pitch steps P; and a third warp fiber (respectively numbered 31, 34, 37, 40) connecting a lower intermediate weft fiber (3, 10, 17, 24) of a four-weft fiber column (C1, C3, C5, C7) to the bottommost weft fiber (18, 25, 4, 11) of a four-weft fiber column (C5, C7, C1, C3) spaced apart from the preceding column by at least two pitch steps P, the third warp fiber returning over a lower intermediate weft fiber (3, 10, 17, 24) of a four-weft fiber column (C1, C3, C5, C7) that is spaced apart from the first column by at least four pitch steps P.

The positions of the parallel warp fibers (29, 30, 31; 32, 33, 34; 35, 36, 37; 38, 39, 40) are offset longitudinally by one pitch step P from one plane to another. Continuous lines represent the warp fibers 29, 30, 31 of plane P1, short dashed lines represent the warp fibers 23, 33, 34 of plane P2, chain-dotted lines represent the warp fibers 35, 36, 37 of plane P3, and finally long dashed lines represent the warp fibers 38, 39, 40 of the plane P4. The offset can be seen particularly clearly.

Returning to FIG. 2, the pattern 110 is cut out from said fabric in such a manner that the weft fibers extend along the axis of symmetry 114 of the pattern 110.

Figure 3:
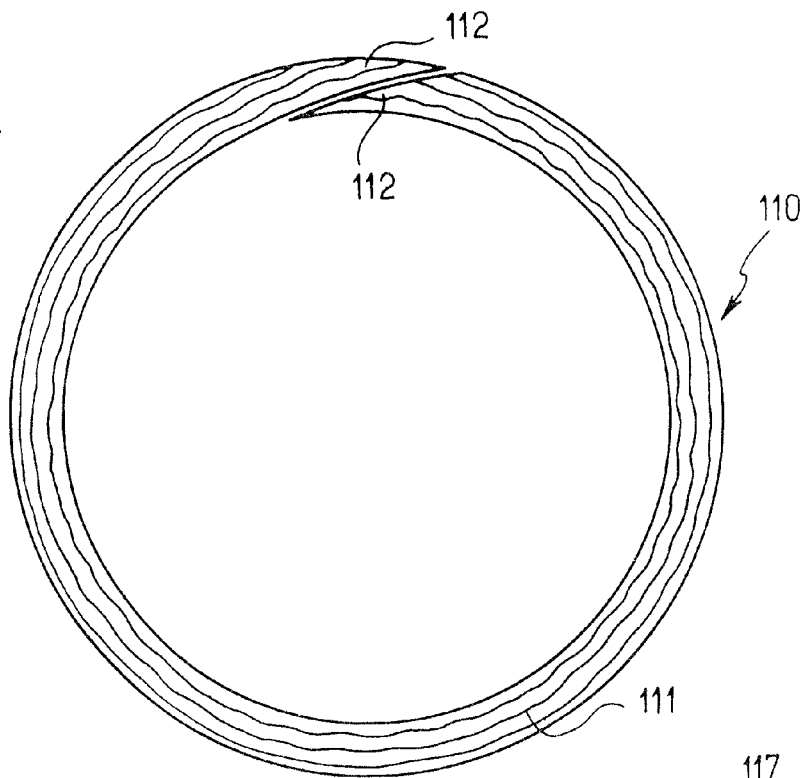
FIG. 3 is a section on line III-III through the body of the FIG. 1 connecting rod.

According to a particular aspect of the invention, the pattern 110 is then rolled up to form a tube by bringing its edges 112 close together. As shown diagrammatically in FIG. 3, the plies of the fabric slide relative to one another, with sliding being zero on the axis of symmetry 114 and at its maximum in the vicinity at the edges 112, such that the edges take on a chamfered shape.

The edges 112 are then placed against one another. Preferably, the end face of one of the edges 112 bears against the inside face of the pattern 110 so that the thickness of the resulting tube is substantially constant in the join zone.

Since the edges 112 are not parallel in this example, a tubular portion is obtained that is conical in shape. However it would be possible to obtain a cylindrical tubular portion in the same manner by cutting the pattern 110 to have edges 112 that are parallel.

Figure 4:
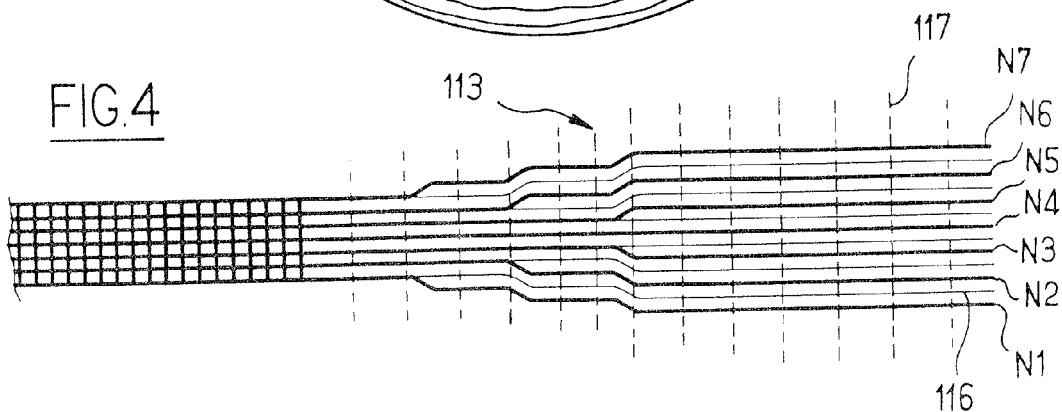

According to a particular aspect of the invention, as shown in FIG. 4, the warp fibers are removed from the ends of the extensions 113 in order to separate the primary plies formed by the weft fibers. This produces primary plies N1 to N7 (seen edge-on and represented by thick lines) that can be spaced apart from one another. Intermediate plies 116 (represented by fine lines with only one intermediate ply being given a reference) are inserted between adjacent primary plies so that the fibers constituting the intermediate plies 116 extend obliquely, preferably at 45° relative to the weft fibers making up the primary plies N1 to N7.

The intermediate plies 116 are preferably disposed in such a manner as give the extensions 113 thickness that varies progressively so as to reach an end thickness that is constant and substantially twice that of the fabric. To do this, intermediate plies 116 are inserted of lengths that increase with increasing distance from the center of the extension 113.

Transverse fibers 117 are then introduced across the primary plies N1 to N7 and the intermediate plies 116 in order to reinforce the ends of the extensions 113 (the transverse fibers are represented by dashed lines, with only one of them carrying a reference in the figure. This gives a three-dimensional structure to said end that is particularly strong and that prevents the plies from sliding one on another. The transverse fibers are preferably inserted by stitching.

The pattern fitted with its intermediate plies is shaped on a mandrel (not shown). Thereafter, using the conventional resin transfer molding (RTM) technique, resin is diffused between the fibers of the pattern and of the intermediate plies.

The overlapping edges 112 are thus bonded together by the resin. The overlapping chamfers provide a larger bonding area between the two edges 112 such that the join (visible in FIG. 1) is very strong and makes the connecting rod suitable for withstanding stresses both in tension and in compression.

This produces a strong tubular body with two arms of increased thickness at each end formed by the extensions, said arms extending facing each other in pairs. It then remains to cut the arms to shape and to pierce them in order to transform them into the lugs 104. This produces the connecting rod shown in FIG. 1 that is made entirely out of composite material.

Figure 5:
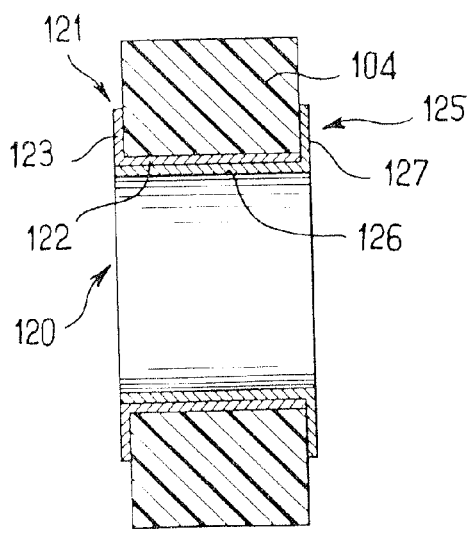
FIG. 5 is a section view on line V-V of FIG. 1.

Preferably, and as shown in FIG. 5, the lugs are each provided with a pair of rings 120, each pair comprising a first ring 121 having a cylindrical portion 122 extending in the hole in one of the lugs 104, together with a collar 123 extending against one of the flanks of the lugs 104, and a second ring 125 having a cylindrical portion 126 extending tightly inside the cylindrical portion 122 of the first ring 121, together with a collar 127 that bears against the end of said cylindrical portion 122. The length of said cylindrical portion 122 is preferably very slightly shorter than the width of the lug 104 so that the lug is lightly clamped between the collars 123 and 127.

Such a connecting rod is advantageously used for constituting folding braces or stays for landing gear. Such braces comprise two connecting rod elements that are hinged together and that work essentially in traction and compression, such that the connecting rod of the invention can advantageously be used in such an application. In addition, it is known that such braces or stays can also be subjected to impacts, e.g. from stones thrown up by the tires. The "2.5 D" fabric used is specifically well-known for its high resistance to impacts and to delamination.

Dimensioning has shown that the saving in weight compared with metal braces or stays is significant. Furthermore, manufacturing time is considerably shortened.

The invention is not limited to the description above, but on the contrary covers any variant coming within the ambit defined by the claims.

In particular, although the use of a particular fabric is described with reference to FIG. 6, it is possible to use a similar fabric having a larger number of primary plies, or indeed to use other fabrics that allow primary plies to slide relative to one another. Such a fabric can be obtained by superposing primary plies and stitching them together loosely.

In order to reinforce the edge-to-edge join, it is possible to stitch the two edges together before polymerization.

Although the method of the invention is associated with a connecting rod, the method of the invention can be applied equally well to any other structural element made of composite material.

What is claimed is:

1. A method of fabricating a lug on a structural element of composite material, said structural element being made from a pattern presenting two opposite edges cut out from a fiber fabric made up of superposed primary plies bonded together in such a manner that the plies can slide relative to one another, said pattern having at least one extension for forming the lug, the method including rolling the pattern into a tube to form a body of the structural element in such a manner that the primary plies slide relative to one another to give a chamfer shape to the two edges, the chamfer-shaped edges being joined so that they overlap, the method further including separating the primary plies in the at least one extension, inserting intermediate plies between the primary plies, and piercing the at least one extension to produce a lug.

2. A method according to claim 1, in which the pattern is cut from fabric comprising a base weave which is constituted:
firstly by at least twenty-eight weft fibers organized in at least eight columns each extending in the thickness direction of the fabric, and disposed in a staggered configuration with alternation between columns having at least three superposed weft fibers spaced apart at a predetermined pitch, and columns having at least four superposed weft fibers spaced apart by the same pitch, the weft fibers extending to define at least seven primary plies; and
secondly, by at least twelve warp fibers disposed in at least four parallel planes that are offset in the weft fiber direction, each plane containing three superposed parallel warp fibers arranged in each of these planes as follows:
a first warp fiber connects the topmost warp fiber of a four-weft fiber column to an upper intermediate weft fiber of a four-weft fiber column that is spaced apart from the preceding column by at least two pitch steps, the first warp fiber returning over a top end weft fiber of a four-weft fiber column that is spaced apart from the first column by at least four pitch steps;
a second warp fiber connecting a top intermediate weft fiber of a four-weft fiber column to a lower intermediate weft fiber of a four-weft fiber column that is spaced apart from the preceding column by at least two pitch steps, the second warp fiber returning over an upper intermediate weft fiber of a four-weft fiber column that is spaced apart from the first column by at least four pitch steps; and
a third warp fiber connecting a lower intermediate weft fiber of a four-weft fiber column to the bottommost weft fiber of a four-weft fiber column spaced apart from the preceding column by at least two pitch steps, the third warp fiber returning over a lower intermediate weft fiber of a four-weft fiber column that is spaced apart from the first column by at least four pitch steps;
the positions of the parallel warp fibers being offset longitudinally by one pitch step from one plane to another.

3. A method according to claim 1, in which the pattern has an axis of symmetry and is cut out from said fabric in such a manner that the primary plies have weft fivers that extend along the axis of symmetry.

4. A method according to claim 1, in which the pattern has at least two extensions that come to face each other when the pattern is rolled into a tube.

5. A method according to claim 1, in which the intermediate plies are inserted to have fibers that are oriented obliquely relative to weft fibers forming the primary plies in the extension.

6. A method according to claim 1, in which transverse fibers are inserted through the primary plies and the intermediate plies.

7. A method according to claim 1, in which intermediate plies are inserted that are of lengths that increases with increasing distance on either side of a central plane of the extension.

8. A method according to claim 1, in which the at least one extension is pierced after resin has been injected and polymerized to form a lug or lugs of coupling forks.

9. A method according to claim 2, in which the holes pierced are fitted with pairs of rings.

* * * * *